United States Patent [19]
Ďuran et al.

[11] 3,815,402
[45] June 11, 1974

[54] MULTIOPERATION MACHINE WITH CIRCULAR MOVEMENT

[75] Inventors: Ondrej Ďuran; Rudolf Radič, both of Nove Mesto Nad Vahom, Czechoslovakia

[73] Assignee: Vyskumny ustav mechanizacie a automatizacie, Nove Mesto nad Vahom, Czechoslovakia

[22] Filed: Feb. 20, 1973

[21] Appl. No.: 333,810

[30] Foreign Application Priority Data
Feb. 21, 1972  Czechoslovakia ................. 1084-72

[52] U.S. Cl. ..................... 72/404, 72/94, 72/187, 72/356
[51] Int. Cl. ......................................... B21j 11/00
[58] Field of Search ........ 72/404, 68, 306, 311, 94, 72/187, 356; 29/33 J, 37 R, 38 R, 38 A, 38 C, 35.5, 36, 565; 83/267

[56] References Cited
UNITED STATES PATENTS
210,165   11/1878   Stockwell ............................. 29/37
996,122   6/1911   Osborn ................................. 72/94
1,315,114   9/1919   Gray ..................................... 72/94
2,281,574   5/1942   Gladfelter et al. ..................... 72/94
3,581,542   6/1971   Wahler ................................. 72/94

Primary Examiner—Charles W. Lanham
Assistant Examiner—James R. Duzan
Attorney, Agent, or Firm—Murray Schaffer

[57]  ABSTRACT

A multioperation machine, particularly a machine tool with circular movement enabling a number of operations to be performed with a workpiece clamped permanently on a clamping unit. The workpiece is adapted to be intermittently turned in the course of a partial circular movement of the machine so as to come in alignment with a particular tool capable to perform a required operation, and includes means bringing the workpiece in engagement with the respective tool.

3 Claims, 3 Drawing Figures

MULTIOPERATION MACHINE WITH CIRCULAR MOVEMENT

BACKGROUND OF THE INVENTION

This invention relates to a multioperation machine, particular a machine tool with circular movement, capable of performing in the course of one revolution of its rotor at least two technological operations in a single working position, such as for instance pressing, reduction, pulling, seaming, lathe-turning, boring and the like.

In known machines of this kind employing a continuous circular movement of the working site, only a single operation is performed in one working position. There is for instance a known arrangement of a circular rotor machine having a number of working sites distributed regularly and in parallel on a spacing cylinder, each of which working sites have tools and a place for the workpiece. The technological operation is performed in the course of a continuous rotation of the working sites, whereby each of the tools performs a technological operation on the workpiece at a particular working site, returns into its starting position and prepares the workpiece to be delivered to a take-over device, which is generally a rotor transport device. Such a circular machine performs at each of its working sites the same technological operation. If additional technological operations have to be performed, a number of similar single operation machines have to be used in a production line and transport means have to be provided, for the displacement of the workpieces between them. A similar working line necessary to perform, for instance four operations, must therefor, consist of four rotor machines and three transport means. Thus arranged rotor machines, utilize to relatively small extent each operating position and the required floor space for the frame of a similar rotor line is great.

There are also known multioperation machines performing one operation in one working position and a second operation in another working position on the machine. Each operation is however performed in the course of another revolution of the machine. These rotor machines meet the requirement of multioperation, but their performance level drops directly proportional with the number of operations performed on these machines and need in addition some transport means securing the movement of the workpiece. Another drawback of both mentioned arrangements is that the workpiece has to be released after each operation, brought to chucks of the following rotor machine which has to take it over and clamp it again, so that the danger of wear on the surface of the workpiece for instance through fine scratching, increases greatly. A further drawback is, that the reliability of the working line decreases with the number of take-over sites, each of which is a possible source of failure. Another known arrangement of multioperation rotor machines is a machine adapted to perform a number of operations in the course of one revolution of a circular machine where the workpiece does not change its position with respect to the rotor in the course of all technological operations, where the tools situated above the workpiece are subsequently fed to the workpiece according to the sequence of the technological such operations. This arrangement is however suitable for operations only, requiring simple tools, as the feeding of a complicated tool head into engagement with the workpiece rather frequently complicates the construction of the rotor machine and increases its cost.

It is an object of this invention to provide a multioperation rotor machine, which can perform a number of technological operations in the course of a single revolution of the machine, while the workpiece is permanently clamped.

It is another object of this invention to enable the combined use of this machine in a working line with single operation rotor machines. A further object of this invention is to let the tools make only their technological movement, so that they are capable of performing demanding and rigorous operations, requiring complicated tools.

SUMMARY OF THE INVENTION

The multioperation machine with circular movement according to this invention comprises a lower sleeve and an upper sleeve firmly connected to the machine frame supporting a rotor. In the upper part of the rotor there are provided slides, with a tool head with at least two different working tools connected to each slide. A rototable position device is supported in the lower part of the rotor below each tool head parallel with their plane. A guiding rod is fixed to each position device eccentrically to each position device. Clamping means is slidingly supported on said guiding rod having on one side a guiding roller engaging with a cam on the rotor body, with a turning mechanism of each position device in its lower part. The turning mechanism of this machine is furthermore in the shape of a flange having grooves in its base aiming from the external circumference to the center of the flange. A roller is situated in the space defined between two grooves, the roller engaging into an arresting disk fixed to the lower sleeve. The upper face of this arresting disk is provided with a guiding track for the turning mechanism, with stops arranged close to this guiding track so as to be in the circular track of the end of a guiding groove.

The multioperation machine according to this invention enables the performance of a number of technological operations in the course of a single revolution of the machine and with a single clamping of the workpiece. It can be introduced into a production line together with machines with single operation rotors. The tools make only a technological movement so that they can perform demanding operations requiring complicated tools. The turning mechanism allows also selection of a different time interval for individual operations which are performed on the machine. The machine itself is not complicated, needs no special attention and is relatively cheap.

DESCRIPTION OF DRAWINGS

A multioperation machine with a circular movement according to this invention is by way of example shown in the attached drawings, where.

DESCRIPTION OF PREFERRED EMBODIMENT

Figure 1:
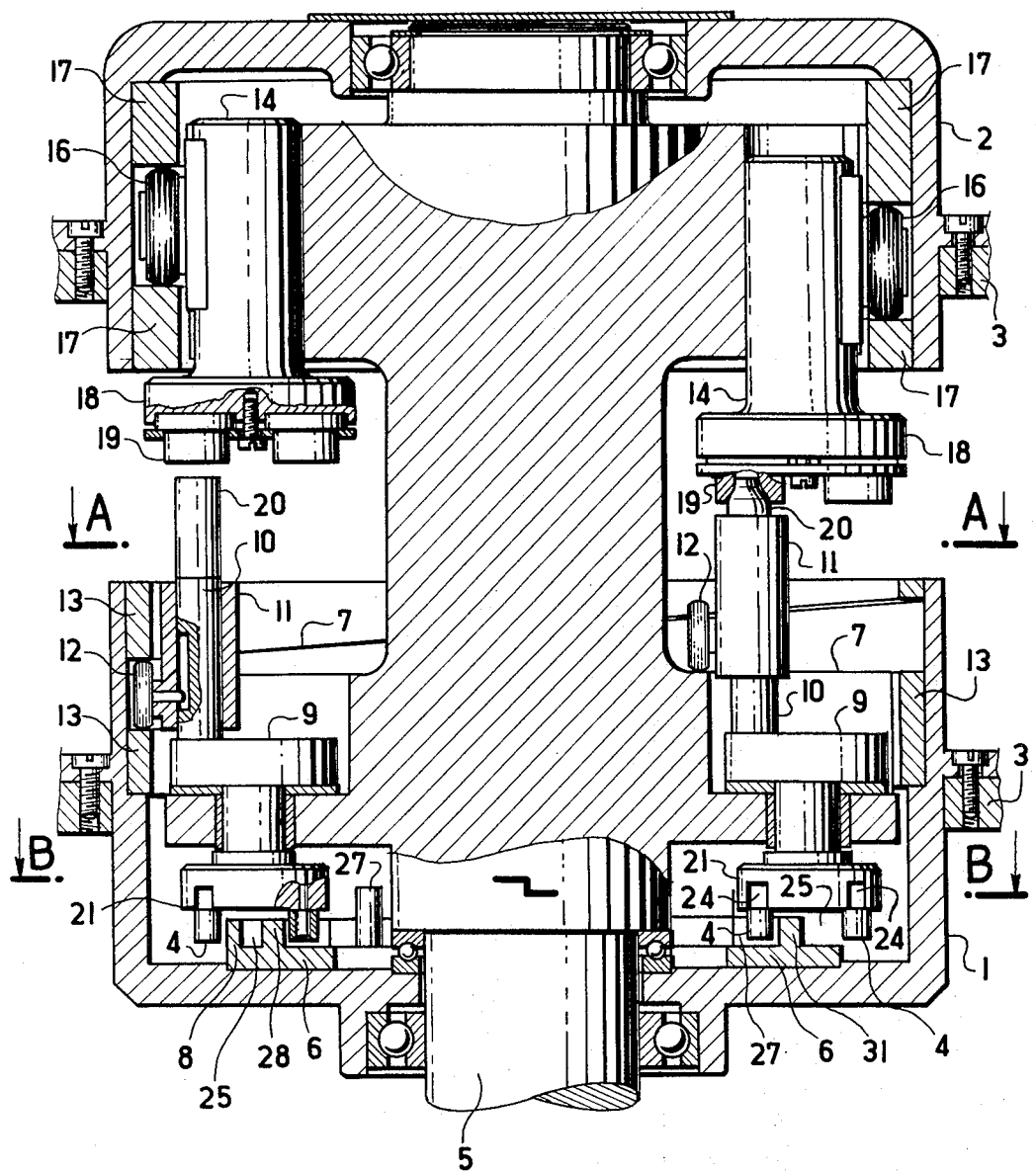
FIG. 1 is an elevation partly in section showing the overall arrangement.
Figure 2:
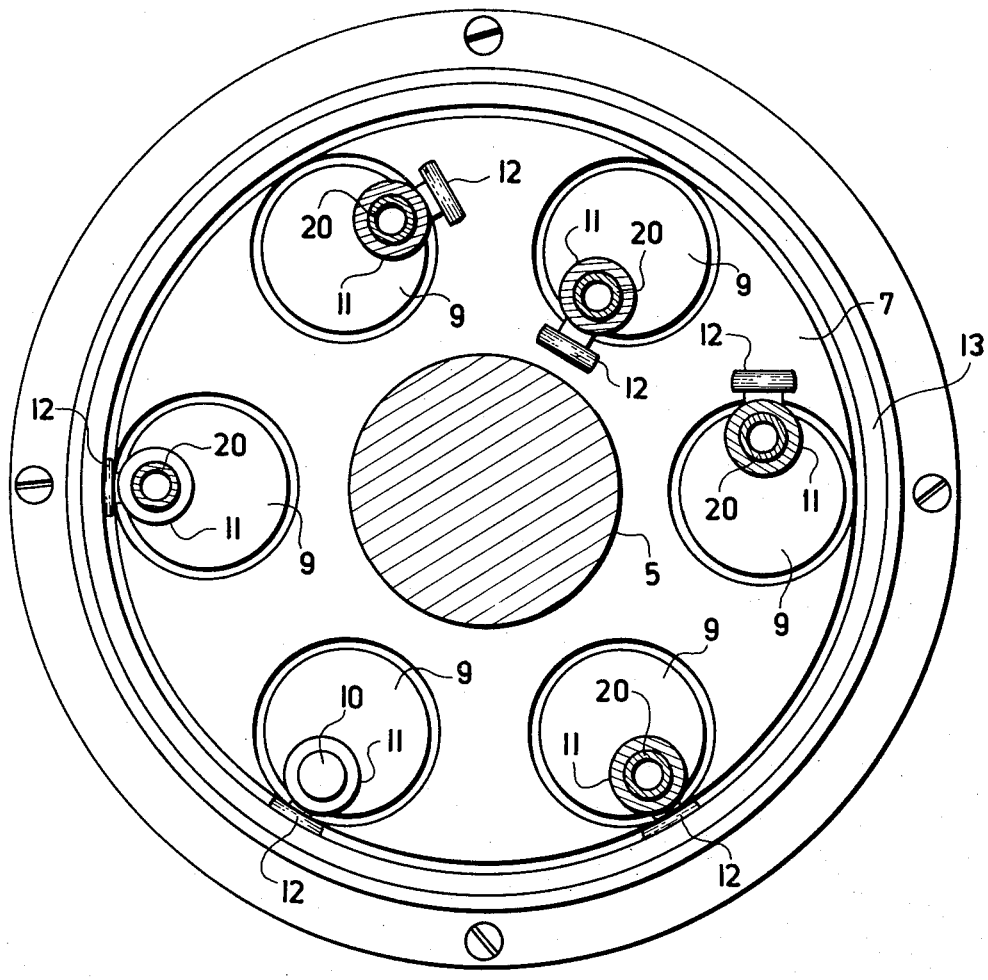
FIG. 2 is a top view in section along a plane indicated in FIG. 1 by A—A, showing the turning of individual position devices and FIG. 3 a top view in section along a plane indicated in FIG. 1 by B—B showing the relative position of grooves of the turning mechanism.

The multioperation machine with circular movement shown in the drawings comprises an upper sleeve 1 and a lower sleeve 2, both these sleeves being fixed to the machine frame 3 (see FIG. 1). A rotor 5 is rotatably supported by these sleeves 1 and 2. Six slides 14 are arranged slidable parallel with the longitudinal axis of the rotor 5 in the upper partn of the rotor. The slides 14 are provided each with a lateral guiding roller 16 cooperating with a cam 17. A tool head 18 is fixed to the lower part of each slide 14. Four different working tools 19 are clamped in each tool head 18. A position device 9 is situated rotatably in the lower part of the rotor below each tool head 18, coaxially with this tool head 18. A guiding rod 10 is fixed to the upper part of each position device 9 parallel but eccentrically with respect to the longitudinal axis of both the position device 9 and the toolhead 18. The guiding rod 10 serves both as a guide for a clamping device 11 and as a support of the workpiece 20. A clamping device 11 for the clamping of the workpiece is slidingly arranged on the guiding rod 10. The clamping device 11 has a lateral roller 12 cooperating with a cam 13 and with a cam 7. The cam 7 is part of the body of the rotor 5.

Figure 3:
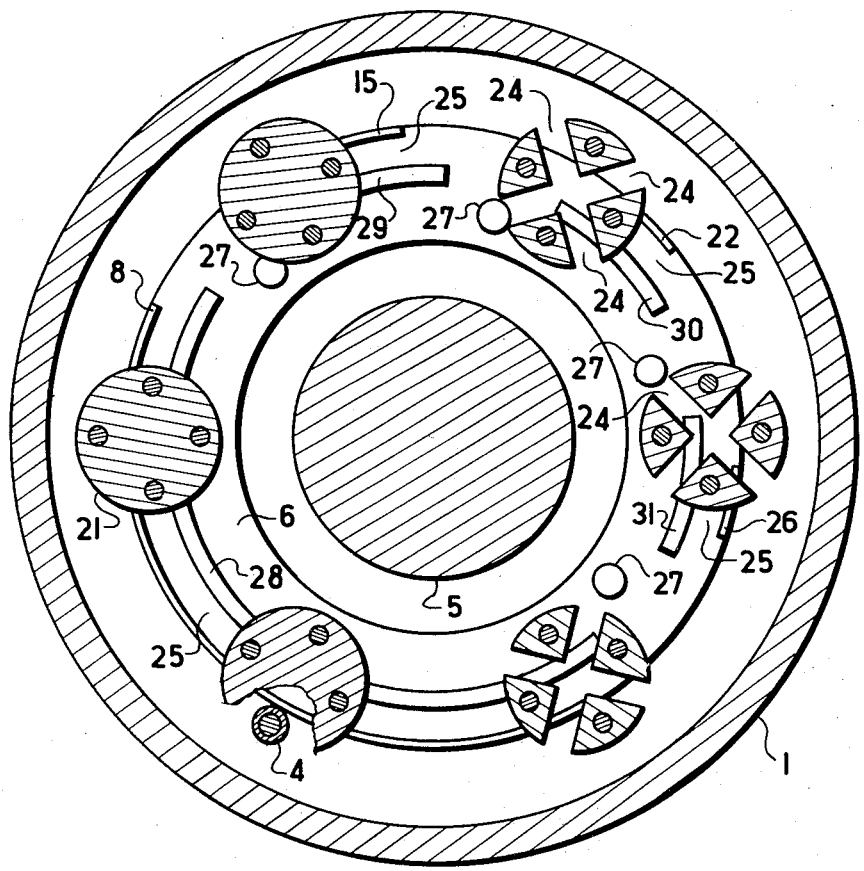

A turning mechanism 21 is fixed to the bottom to the shaft of each position device 9. The turning mechanism is in the shape of a flange having grooves 24 in its base (see FIG. 3). There are four grooves 24 in all, extending from the external circumference of the flange to its center. A roller 4 engaging into an arresting disk 6 is provided in the space defined by two adjacent grooves 24 (see FIG. 1 and 3). The arresting disk 6 is fixed to the lower sleeve 1. The upper face of the arresting disk 6 is provided with partial external side walls 8, 15, 22, 26 on a common circle and with partial internal side walls 28, 29, 30, 31 equally on a common circle. The external side walls 8, 15, 22, 26 form together with the internal side walls 28, 29, 30, 31 a guiding track 25 for rollers 4 of the turning mechanism 21. The partial external side walls 8, 15, 22, 26 follow each other so as to leave between themselves a space required for turning the turning mechanism 21 by an angle of 90°. The partial internal side walls 28, 29, 30, 31 follow each other so as to leave between themselves a space larger than the distance between two opposite rollers 4. Stops 27 are provided on the upper face of the arresting disk 6 in the free space between two internal side walls at a place, coincident with the track of the end of a groove 24 deviated toward the center of the rotor 5. The control of all mechanisms is derived from a drive of the whole arrangement not shown on the drawing, which transmits to the rotor 5 a circular movement in a clockwise direction.

The working cycle of the multioperation machine with circular movement starts when a feeding device not shown in the drawing inserts a workpiece into the guiding track 25 at a place between the external side wall 8 and the internal side wall 28 (see FIG. 3) on the upper face of the guiding rod 10 (see FIG. 1) with a following turning of the rotor 5, whereby the guiding roller 12 of the clamping device 11 follows the course of the cam 13 and shifts the clamping device 11 on the workpiece 20 until the roller 12 reaches the level of the cam 7. The clamping of the workpiece 20 is finished with the finished upward movement of the guiding roller 12.

In the course of a further turning of the rotor 5 the guiding roller 16 starts, by engagement with the cam 17, to move the slide 14 with the tool head 18 with the tools 19 downwards, whereby each tool 19 of the tool head 18 serves for another operation. In the course of the downward movement of the slide 14 the respective tool 19 performs the technological operation in the prior determined technological sequence which takes place at the same guiding track in which th workpiece 20 has been received. After finishing the first operation, the slide 14 returns in the course of a continued turning of the rotor 5 into its initial position and simultaneously the position device 9 with the clamped workpiece 20 approaches after the finished first operation with the end of the groove 24 of the turning mechanism 21 towards the stop 27 and since at the same time the external side wall 8 and the internal side wall 28 terminate, the stop 27 enters the groove 24 so that in the course of subsequent turning of the rotor 5 a deviation of the turning mechanism 21 for 90° is accomplished, whereby the position device 9 with the workpiece 20 comes below a further working tool 19.

The second operation is accomplished when the turning mechanism 21 is guided in the guiding track 25 determined by the external side wall 15 and the internal side wall 29. After the operation is finished the respective groove 24 comes again in engagement with the stop 27 and in the course of a further turning of the rotor 5 the position device 9 is turned for further 90° whereby the workpiece 20 is brought below the tool 19 assigned for the third technological operation, which is performed in the course of a movement as described for the first operation. The turning mechanism 21 is however now guided along a guiding track determined by the external side wall 22 and the internal side wall 30. After the third operation is completed the respective groove 24 comes again in engagement with the stop 27 and the turning mechanism 21 turns the position device 9 for 90° below the fourth tool 19.

The fourth operation is performed while the turning mechanism is guided along the guiding track 25 determined by the external side wall 26 and the internal side wall 31. After this operation the working cycle is finished and the turning mechanism 21 is again turned by the stop 27 for 90° and the clamping device 11 returns into its starting position, preparing thus the finished workpiece for taking over and removal. This takes place along the guiding track 25 determined by the external side wall 8 and the internal side wall 28. After taking over the workpiece 20, the position device 9 is prepared to receive another workpiece.

The cycle including all operations starting with the feeding of the workpiece 20 up to the taking over and removal of the finished piece takes place in the course of a single revolution of the rotor 5, whereby further position devices 9 are included into the technological process. The turning mechanism 21 is thereby arrested against deviation by a couple of rollers 4 engaging in the guiding track 25 determined by the respective side walls.

We claim

1. Multioperation machine with circular movement around a vertical axis comprising a frame, a rotor supported rotatably on said frame, a number of slides supported vertically slidingly on the rotor, a tool head with at least two working tools connected to each slide, a position device supported rotatably around a vertical axis in the lower part of the rotor below each tool head, a guiding rod supporting a workpiece fixed to each position device parallel and eccentrically with respect to its rotation axis, a clamping means supported slidingly on this guiding rod, a guiding roller provided on one side of this clamping means, cam means arranged on the rotor body, the guiding roller on the clamping means engaging with these cam means a turning mechanism for intermittent turning of the position device with respect to the rotor body provided in the lower part of each position device, and means for mutual feeding of the tool head with respect to the workpiece whereby said workpiece is moved into engagement with a working tool on said tool head, subsequently moved out of engagement with said working tool, then rotated into alignment with a second working tool on said tool head, engaged with said second working tool on said tool head, and then disengaged with said second working tool to be operated on by subsequent working tools on said tool head or removed from said machine.

2. Multioperation device as in claim 1 the turning mechanism having the shape of a flange, grooves provided at the base of this flange, said grooves aiming from the external circumference to the center of the flange, rollers situated in the space between adjacent grooves, an arresting disk fixed to the lower sleeve, a guiding track on the upper face of this arresting disk, the rollers on the flange adapted to engage into this guiding track, stops provided on the upper face of the arresting disk close to the guiding track so as to be in the circular track of the end of a guiding groove.

3. The multioperation device of claim 1 wherein said frame includes an upper and a lower sleeve between which said rotor is arranged, said rotor being provided with roller means supported by said sleeves.

* * * * *